(12) United States Patent
Miyauchi et al.

(10) Patent No.: US 7,471,789 B2
(45) Date of Patent: Dec. 30, 2008

(54) ENCRYPTION CIRCUIT ACHIEVING HIGHER OPERATION SPEED

(75) Inventors: Shigenori Miyauchi, Hyogo (JP); Atsuo Yamaguchi, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 704 days.

(21) Appl. No.: 10/647,308

(22) Filed: Aug. 26, 2003

(65) Prior Publication Data

US 2004/0081317 A1  Apr. 29, 2004

(30) Foreign Application Priority Data

Oct. 24, 2002  (JP) ............................. 2002-310009

(51) Int. Cl.
  *H04K 1/00* (2006.01)
(52) U.S. Cl. ........................... 380/28; 713/100
(58) Field of Classification Search ............... 713/1, 713/2, 188, 194, 100; 380/200, 201, 255, 380/277, 28; 726/2
See application file for complete search history.

(56) References Cited

U.S. PATENT DOCUMENTS

| | | | | |
|---|---|---|---|---|
| 3,643,106 A | * | 2/1972 | Berwin et al. | 377/57 |
| 4,658,094 A | * | 4/1987 | Clark | 380/28 |
| 5,161,193 A | * | 11/1992 | Lampson et al. | 713/151 |
| 5,313,530 A | * | 5/1994 | Iwamura | 380/28 |
| 5,321,752 A | * | 6/1994 | Iwamura et al. | 713/174 |
| 5,754,616 A | * | 5/1998 | Miura | 377/115 |
| 5,765,218 A | * | 6/1998 | Ozawa et al. | 711/219 |
| 5,987,489 A | * | 11/1999 | Monier | 708/523 |
| 6,035,317 A | * | 3/2000 | Guy | 708/620 |
| 6,088,453 A | * | 7/2000 | Shimbo | 380/28 |
| 6,101,621 A | * | 8/2000 | Kondo | 714/724 |
| 6,341,299 B1 | * | 1/2002 | Romain | 708/523 |
| 6,614,864 B1 | * | 9/2003 | Raphaeli et al. | 375/371 |
| 6,870,929 B1 | * | 3/2005 | Greene | 380/28 |
| 7,017,064 B2 | * | 3/2006 | Thomas et al. | 713/400 |
| 2002/0065574 A1 | * | 5/2002 | Nakada | 700/121 |
| 2002/0101984 A1 | | 8/2002 | Asami | |
| 2003/0033340 A1 | | 2/2003 | Asami | |
| 2005/0188209 A1 | * | 8/2005 | Chen et al. | 713/183 |

FOREIGN PATENT DOCUMENTS

| | | |
|---|---|---|
| JP | 5-324277 | 12/1993 |
| JP | 7-20778 | 1/1995 |
| JP | 10-269060 | 10/1998 |
| JP | 11-212456 | 8/1999 |
| JP | P2002-229445 A | 8/2002 |

OTHER PUBLICATIONS

U.S. Appl. No. 10/614,831, filed Jul. 9, 2003, Renesas Technology Corp.

* cited by examiner

*Primary Examiner*—KimYen Vu
*Assistant Examiner*—Joseph Pan
(74) *Attorney, Agent, or Firm*—McDermott Will & Emery LLP (57) ABSTRACT

An addition and subtraction circuit performs addition and subtraction using a carry-in signal from another operation circuit, and outputs a carry-out signal generated through addition and subtraction to another operation circuit. A right-shift circuit performs right-shift using a shift-in signal from another operation circuit, and outputs a shift-out signal generated through right-shift to another operation circuit. Therefore, even if a data length of operation data is extended, a propagation path for a carry can be shortened, and an operation clock frequency of an encryption circuit can be increased.

6 Claims, 11 Drawing Sheets

ENCRYPTION CIRCUIT ACHIEVING HIGHER OPERATION SPEED

BACKGROUND OF THE INVENTION

1. Field of the Invention

The present invention relates to a technique for encrypting and decrypting information to be used, and more particularly to an encryption circuit encrypting and decrypting data with an operation such as power remainder operation, Montgomery operation, addition and subtraction, or the like.

2. Description of the Background Art

As an information technology develops, an emphasis has been placed on ensuring security on a information network (prevention of theft or destruction of data). Accordingly, techniques for encrypting and decrypting information have been adopted in many cases. The technique is applied not only to a field of information and communication technology, but also to more familiar fields such as transportation, finance, medical care, distribution, and the like. With respect to the technique for encryption and decryption of this type, it is demanded that security of high level can be implemented with a simple principle.

Examples related to such techniques are disclosed in Japanese Patent Laying-Open No. 5-324277 and Japanese Patent Laying-Open No. 2002-229445.

A method for encrypted communication disclosed in Japanese Patent Laying-Open No. 5-324277 implements a remainder operation $Q=A \cdot B \bmod N$ and a power remainder operation $C=M^e \bmod N$ by repetition of operations of a similar format $Z=U \cdot V \cdot R^{-1} \bmod N$ using N and R (R: a prime integer).

In addition, a power remainder operation circuit disclosed in Japanese Patent Laying-Open No. 2002-229445 includes an e register holding a key e, a Y register holding a multiplier Y for Montgomery conversion, an N register holding a key N, a B2N register holding a value of 2B+N performed in an operation of Montgomery conversion, an X register holding a plaintext X, an operation circuit performing an operation for encryption and decryption, a P register holding an operation result P, and the like. Thus, the power remainder operation circuit can implement a processing with high speed.

Security of most cryptosystems in present days is based on difficulty in finding a private key through calculation, considering time required therefor. For example, when encryption with RSA (Rivest-Shamir-Adleman scheme) is used, security is based on difficulty in prime factorization of an integer N in a short period of time, which is a product of two prime numbers ($N=p\times q$; p and q are prime numbers). Conversely, this means that, in order to ensure security of the RSA scheme, digits of selected prime numbers p and q must be increased, as performance of a calculator such as a computer is enhanced in the future.

Consider an example in which an encryption circuit having a large bit length is configured according to the inventions disclosed in Japanese Patent Laying-Open No. 5-324277 and Japanese Patent Laying-Open No. 2002-229445 described above. The simplest method is to modify the encryption circuit by increasing registers, however, this is not desirable. This is because the time for operation and the size of the encryption circuit will be increased in accordance with the increase of the registers.

In addition, if the bit length which an addition and subtraction circuit can handle at a time is extended, for example, from 128 bits to 256 bits, a propagation path for a carry in addition and subtraction will be extended, leading to difficulty in raising an operation frequency.

SUMMARY OF THE INVENTION

An object of the present invention is to provide an encryption circuit of which operation clock frequency can be raised and of which operation speed can be improved.

According to one aspect of the present invention, an encryption circuit includes a plurality of operation circuits which are connected, and a control circuit controlling the plurality of operation circuits to provide encryption or decryption control. Each of the plurality of operation circuits includes a first register holding operation data, an addition and subtraction circuit performing addition and subtraction with respect to the operation data held in the first register, a right-shift circuit performing right-shift with respect to an operation result by the addition and subtraction circuit, and a second register holding an operation result by the right-shift circuit. An addition and subtraction circuit in a first operation circuit performs addition and subtraction using a carry-in signal from a second operation circuit, and outputs a carry-out signal generated through addition and subtraction to a third operation circuit. A right-shift circuit in the first operation circuit performs right-shift using a shift-in signal from the third operation circuit, and outputs a shift-out signal generated through right-shift to the second operation circuit.

The addition and subtraction circuit in the first operation circuit performs addition and subtraction using the carry-in signal from the second operation circuit, and outputs the carry-out signal generated through addition and subtraction to the third operation circuit. Therefore, even if a data length of the operation data is extended, the propagation path for the carry can be shortened, and the operation clock frequency of the encryption circuit can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Initially, an encryption circuit disclosed in Japanese Patent Laying-Open No. 2002-229445 or the like, which was filed by the present applicant, will briefly be described.

Figure 1:
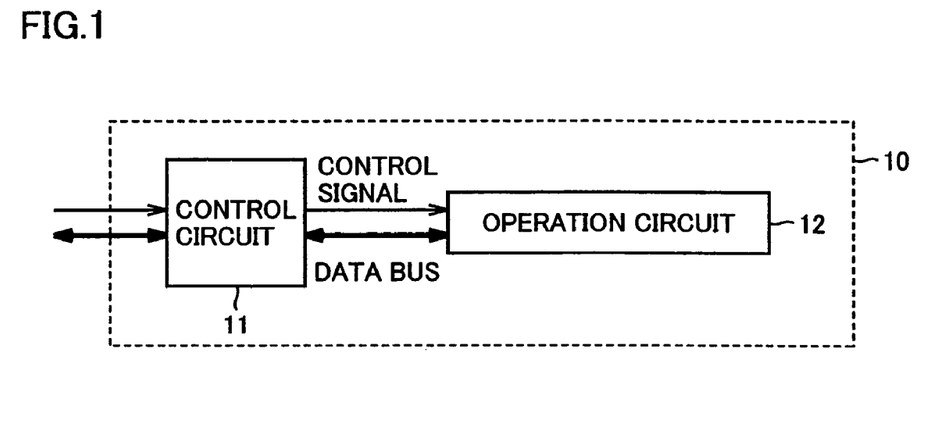
FIG. 1 is a block diagram showing an overall configuration of an encryption circuit shown in the application, which was filed by the present applicant.

FIG. 1 is a block diagram showing an overall configuration of the encryption circuit, which was filed by the present applicant. An encryption circuit 10 includes an operation circuit 12, and a control circuit 11 controlling operation circuit 12 to perform an operation such as power remainder operation, Montgomery operation, addition and subtraction, or the like.

Figure 2:
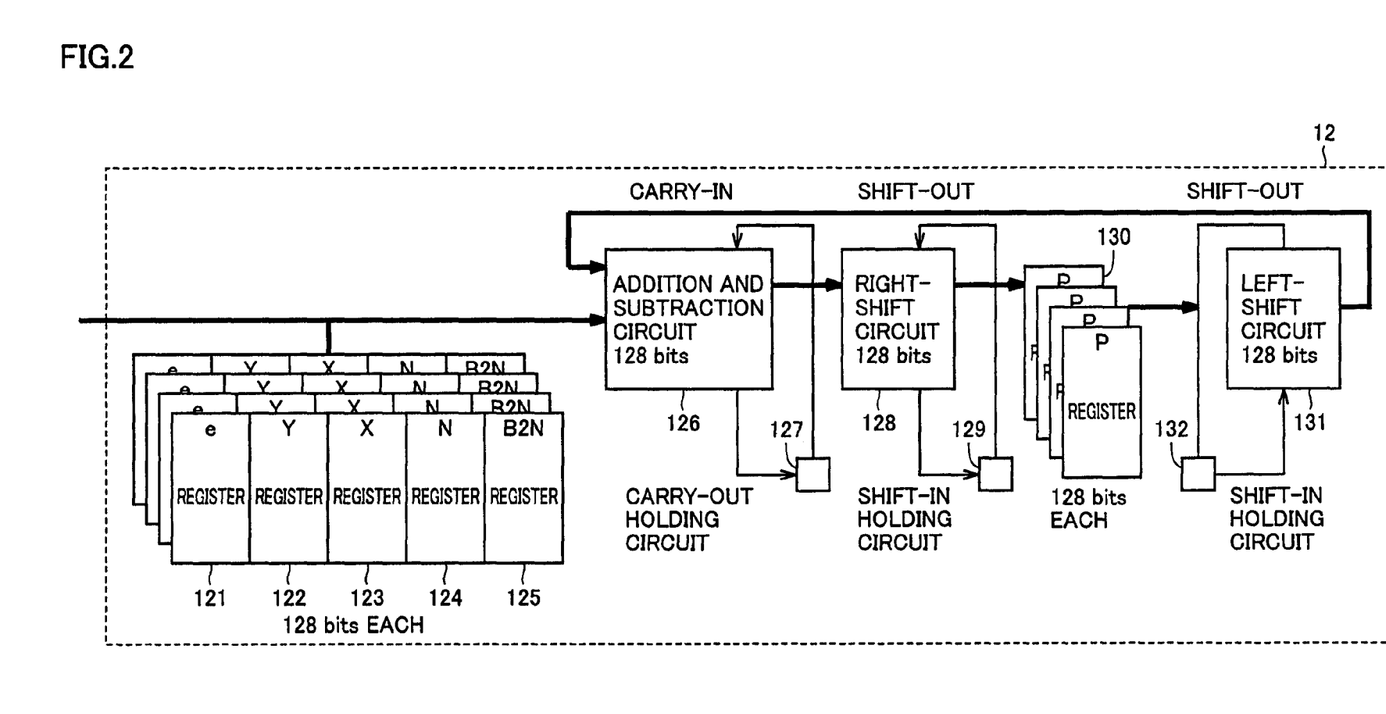
FIG. 2 is a block diagram showing an overall configuration of an operation circuit 12.

FIG. 2 is a block diagram showing an overall configuration of operation circuit 12. Operation circuit 12 includes: four e registers 121 holding key e; four Y registers 122 holding multiplier Y for Montgomery conversion; four X registers 123 holding plaintext X; four N registers 124 holding key N; four B2N registers 125 holding a value of 2B+N performed in an operation of Montgomery conversion; an addition and subtraction circuit 126 of 128 bits; a holding circuit 127 holding a carry of the most significant bit of an operation result output from addition and subtraction circuit 126; a right-shift circuit 128 of 128 bits; a holding circuit 129 holding a shift-out of the least significant bit, caused in a right-shift processing by right-shift circuit 128, for use as a shift-in signal in another right-shift processing; a plurality of P registers 130 temporarily holding an operation result output from right-shift circuit 128; a left-shift circuit 131 of 128 bits; and a holding circuit 132 holding a shift-out of the most significant bit, caused in a left-shift processing by left-shift circuit 131, for use as a shift-in signal in another left-shift processing.

Operation processings such as power remainder operation, Montgomery operation, RSA encryption and the like are implemented mainly by repetition of addition, subtraction, multiplication, and division. Therefore, when control circuit 11 controls operation circuit 12 shown in FIG. 12 to cause the same to repetitively perform the operation in accordance with respective operation algorithms, these operation processings will be achieved. For details of the operation algorithms, refer to the aforementioned references.

First Embodiment

Figure 3:
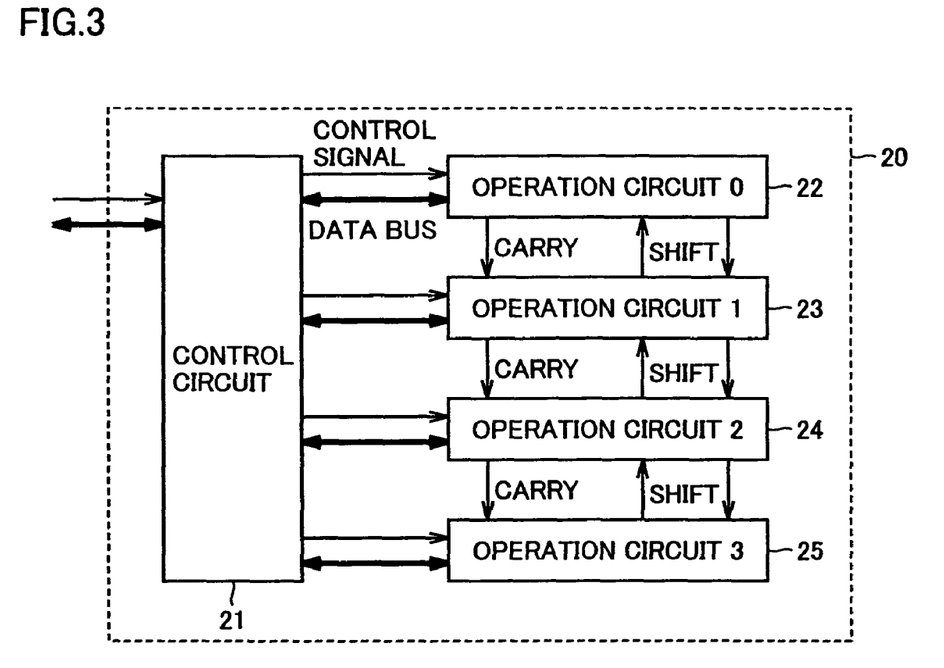
FIG. 3 is a block diagram showing an overall configuration of an encryption circuit in a first embodiment of the present invention.

FIG. 3 is a block diagram showing an overall configuration of an encryption circuit in the first embodiment of the present invention. An encryption circuit 20 includes a control circuit 21 providing overall control of encryption circuit 20, and four operation circuits 0 to 3 (22 to 25). In the present embodiment, RSA scheme is assumed as an encryption scheme, and in addition, operation length of 512 bits is assumed. The present embodiment, however, is not limited to such an example.

Control circuit 21 outputs data, which is received from outside and is necessary for operation, to operation circuits 0 to 3 (22 to 25) via a data bus, and outputs an operation result received from operation circuits 0 to 3 (22 to 25) via the data bus to the outside. In addition, control circuit 21 outputs a control signal to operation circuits 0 to 3 (22 to 25) in accordance with RSA encryption or decryption algorithm.

Figure 4:
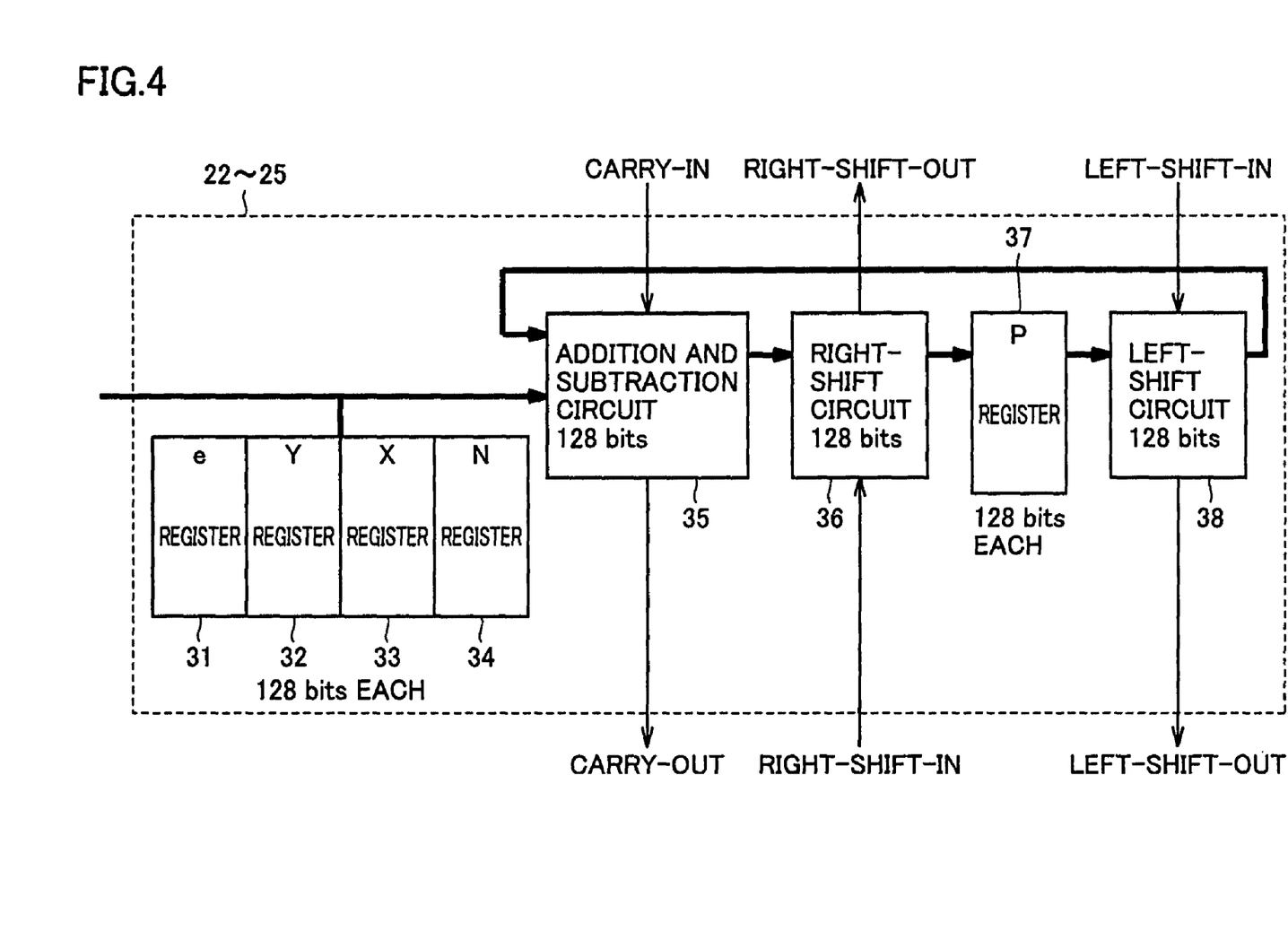
FIG. 4 is a block diagram illustrating an internal configuration of operation circuits 0 to 3 (22 to 25).

FIG. 4 is a block diagram illustrating an internal configuration of operation circuits 0 to 3 (22 to 25). Each of operation circuits 0 to 3 (22 to 25) includes an e register 31 holding key e, a Y register 32 holding an encrypted plaintext Y, an X register 33 holding plaintext X to be encrypted, an N register 34 holding key N, an addition and subtraction circuit 35 of 128 bits, a right-shift circuit 36 of 128 bits, a P register 37 temporarily holding an operation result output from right-shift circuit 36, and a left-shift circuit 38 of 128 bits.

Addition and subtraction circuit 35 performs addition or subtraction with respect to data held in e register 31, Y register 32, X register 33 or N register 34, and outputs an operation result to right-shift circuit 36. In addition, addition and subtraction circuit 35 outputs a carry of the most significant bit of the operation result as a carry-out signal to other operation circuit, while it inputs the carry-out signal from the other operation circuit as a carry-in signal, to set the signal as the least significant bit.

Right-shift circuit 36 shifts to the right, the addition and subtraction result output from addition and subtraction circuit 35, and outputs a shiftout of the least significant bit, caused at that time, as a right-shift-out signal to other operation circuit. In addition, right-shift circuit 36 inputs a shift-out signal from the other operation circuit as a shift-in signal, to set the signal as the most significant bit.

Left-shift circuit 38 shifts to the left, a value held in P register 37, and outputs the shift-out of the most significant bit, caused at that time, as a left-shift-out signal to other operation circuit. In addition, left-shift circuit 38 inputs the shift-out signal from the other operation circuit as the shift-in signal, to set the signal as the least significant bit.

Control circuit 21 divides operation data of 512 bits to 128 bits each, and stores the divided data in e register 31, Y register 32, X register 33 or N register 34 in respective operation circuits 0 to 3 (22 to 25). For example, when the operation data of 512 bits is stored in the e register, bits 0 to 127 of the operation data are stored in e register 31 within operation circuit 0 (22); bits 128 to 255 of the same are stored in e register 31 within operation circuit 1 (23); bits 256 to 383 of the same are stored in e register 31 within operation circuit 2 (24); and bits 384 to 511 of the same are stored in e register 31 within operation circuit 3 (25).

The operation of the data in operation circuits 0 to 3 (22 to 25) is performed by a unit of 1 clock, and the carry is propagated from operation circuit 0 (22), in a direction of higher order (operation circuit 0→1→2→3). A right-shift processing by right-shift circuit 36 is not delayed by the clock, and shift-in to a lower-order operation circuit is performed utilizing an operation clock of a higher-order operation circuit. In order to attain this function, control circuit 21 independently controls a write signal for bits 0 to 126 to P register 37 as well as a write signal for bit 127.

Figure 5:
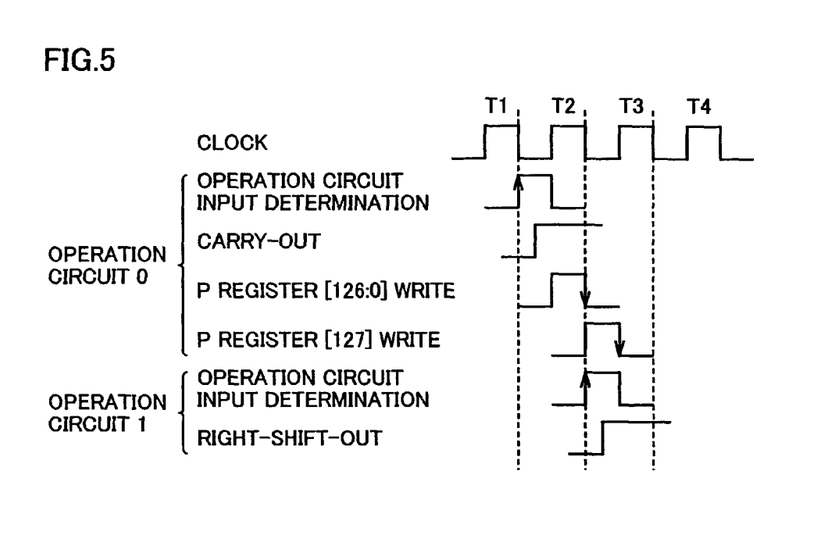
FIG. 5 is a timing chart illustrating an input timing of operation data in the operation circuit and a timing of data write to a P register 37.

FIG. 5 is a timing chart illustrating an input timing of the operation data in the operation circuit and a timing of data write into P register 37. When input data to operation circuit 0 (22) is determined at the fall of clock T1, the carry-out signal is output from addition and subtraction circuit 35.

In addition, bits 0 to 126 of the data are written into P register 37 within operation circuit 0 (22) at the fall of clock T2, and the input data to the higher-order operation circuit 1 (23) is determined. Since the right-shift-out signal of the higher-order operation circuit 1 (23) has not been determined at this timing, bit 127 of the data cannot be written into P register 37 within operation circuit 0 (22). Therefore, bit 127 of the data is written into P register 37 within operation circuit 0 (22) at the rise of clock T3. It is to be noted that the signal timing between other lower-order operation circuit and a higher-order operation circuit is similar to that between operation circuit 0 (22) and operation circuit 1 (23).

Figure 6:
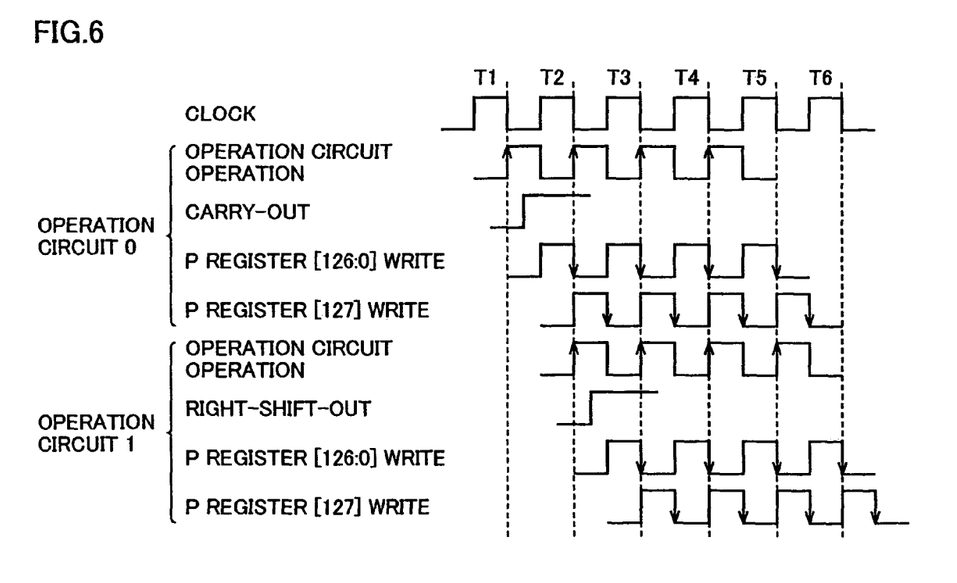
FIG. 6 is a timing chart illustrating a timing in an example in which input of the operation data in the operation circuit and data write to P register 37 are successively performed.

FIG. 6 is a timing chart illustrating a timing in an example in which input of the operation data in the operation circuit and data write into P register 37 are successively performed. Though the timing chart is almost the same as that shown in FIG. 5, it shows that the operation data of 128 bits is processed in each clock cycle. In other words, operation circuits 0 to 3 (22 to 25) require four clocks in order to process the operation data of 512 bits. On the other hand, if positive or negative of an addition and subtraction result is not reflected in a type of a subsequent operation, for example, in a case of repetitive operation of multiplication or Montgomery multiplication remainder operation, next addition and subtraction can be carried out without waiting for completion of the operation. Therefore, the process can be performed in a pipelined manner. In effect, quarter number of docks (1 clock) is sufficient for performing the operation.

As described above, according to the encryption circuit in the present embodiment, the operation data is divided into a plurality of bits. Then, a plurality of operation circuits are caused to operate respective operation data, and only the carry-out and the shift-out are output to the higher-order operation circuit or the lower-order operation circuit. Thus, the size of the operation circuit can be reduced, a propagation path for the carry can be shortened, and the operation clock frequency can be raised.

In addition, compared to the operation circuit processing the operation data of 128 bits, four times the amount of the operation data can be processed with the same number of clocks. Thus, the operation speed can be improved.

Second Embodiment

Figure 7:
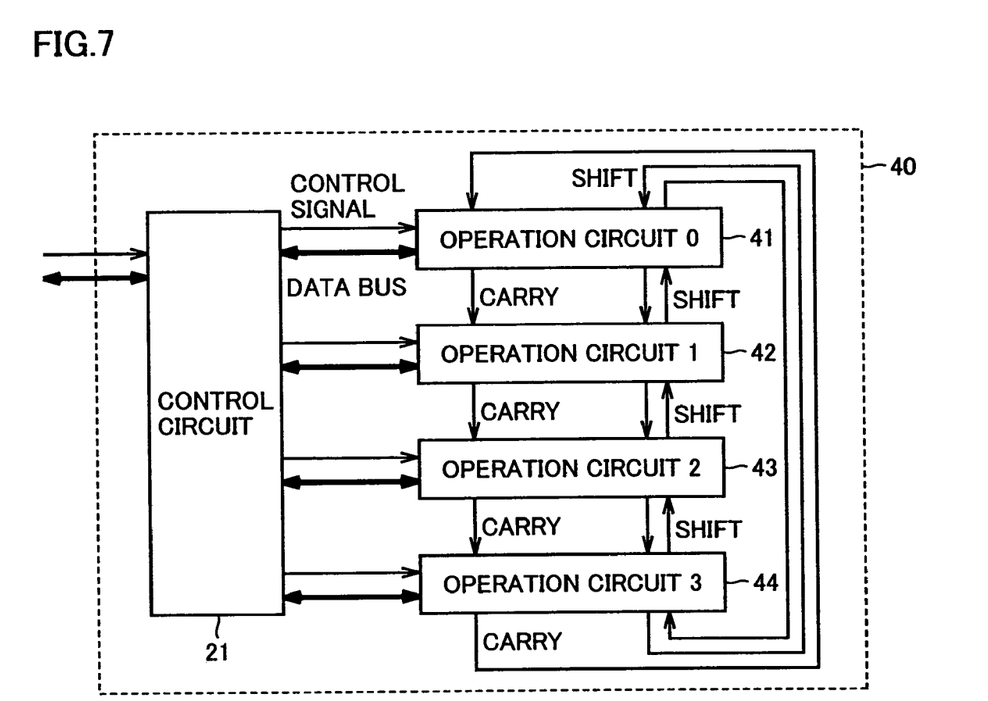
FIG. 7 is a block diagram showing an overall configuration of an encryption circuit in a second embodiment of the present invention.

FIG. 7 is a block diagram showing an overall configuration of an encryption circuit in the second embodiment of the present invention. The encryption circuit in the present embodiment is different from that in the first embodiment shown in FIG. 3 in that the carry-out signal and the left-shift-out signal output from operation circuit 3 are input to operation circuit 0, the right-shift-out signal output from operation circuit 0 is input to operation circuit 3, and the carry-out signal and the shift-out signals form a loop through the operation circuits. Therefore, detailed description for redundant configuration and function will not be repeated. Note that, in the present embodiment, RSA scheme is assumed as the encryption scheme, and an operation length of 1024 bits is assumed. The present embodiment, however, is not limited to such an example.

Figure 8:
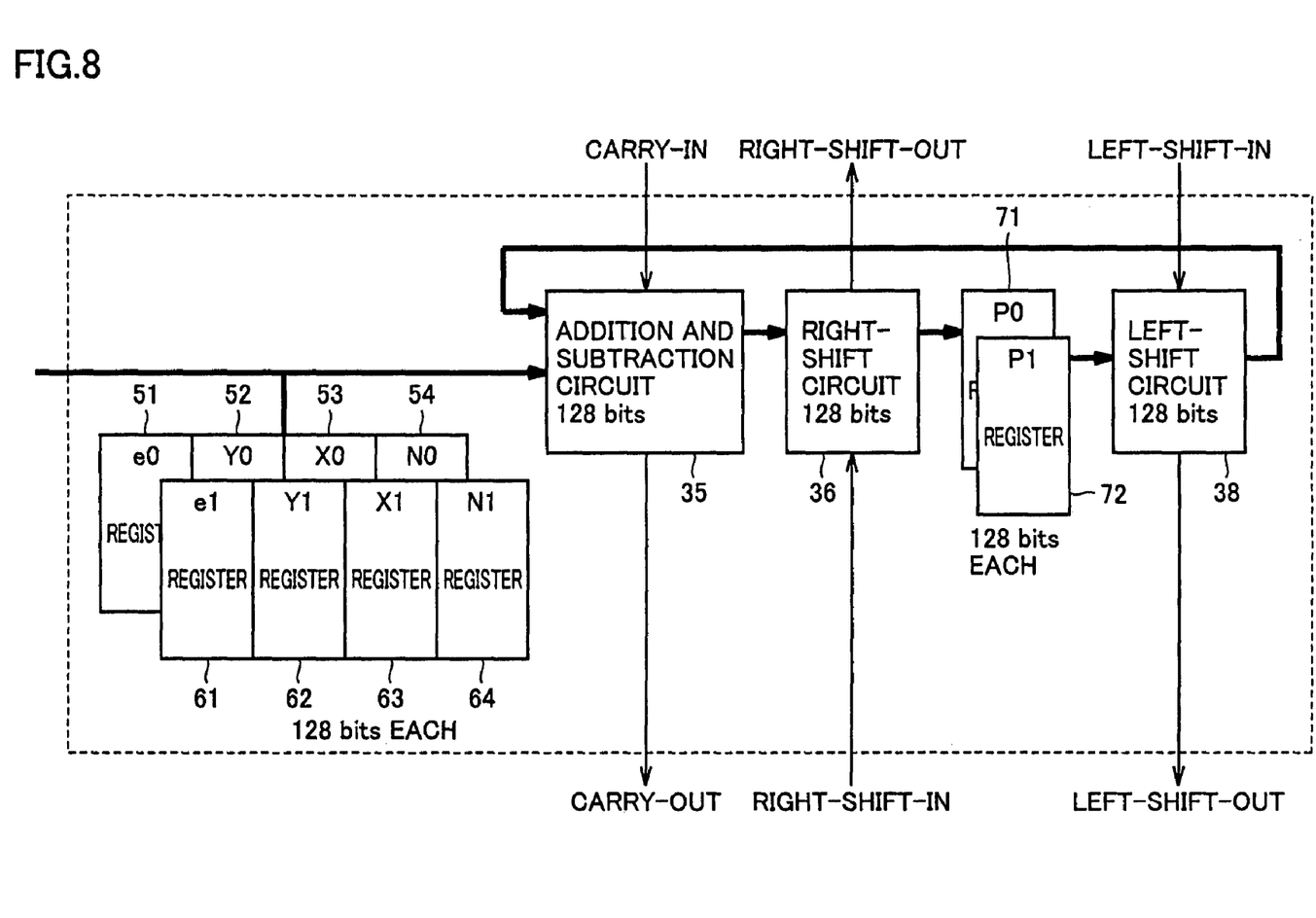
FIG. 8 is a block diagram illustrating an internal configuration of operation circuits 0 to 3 (41 to 44) in the second embodiment of the present invention.

FIG. 8 is a block diagram illustrating an internal configuration of operation circuits 0 to 3 (41 to 44) in the second embodiment of the present invention. Operation circuits 0 to 3 (41 to 44) in the present embodiment are different from operation circuits 0 to 3 (22 to 25) in the first embodiment shown in FIG. 4 only in that the e registers, Y registers, X registers, N registers, and P registers are provided two each. Therefore, detailed description for redundant configuration and function will not be repeated.

Control circuit 21 divides the operation data of 1024 bits into 128 bits each, and stores the divided data in an e0 register 51, a Y0 register 52, an X0 register 53, an N0 register 54, an e1 register 61, a Y1 register 62, an X1 register 63, or an N1 register 64 in each operation circuits 0 to 3 (41 to 44).

For example, when the operation data of 1024 bits is stored in the e registers, control circuit 21 stores bits 0 to 127 of the operation data in e0 register 51 within operation circuit 0 (41); stores bits 128 to 255 of the same in e0 register 51 within operation circuit 1 (42); stores bits 256 to 383 of the same in e0 register 51 within operation circuit 2 (43); and stores bits 384 to 511 of the same in e0 register 51 within operation circuit 3 (44).

In addition, control circuit 21 stores bits 512 to 639 of the operation data in e1 register 61 within operation circuit 0 (41); stores bits 640 to 767 of the same in e1 register 61 within operation circuit 1 (42); stores bits 768 to 895 of the same in e1 register 61 within operation circuit 2 (43); and stores bits 896 to 1023 of the same in e1 register 61 within operation circuit 3 (44).

In performing the operation processing, the operation data is set in addition and subtraction circuit 35 from registers of a length of 128 bits, as appropriate. Thus, each operation circuit can apparently process the operation data of a length of 256 bits. This means that the operation data of a length of 1024 bits can be processed as a whole. In addition, when the operation data of a length of 512 bits is processed, for example, only e0 register 51, Y0 register 52, X0 register 53, N0 register 54, and P0 register 71 are used, whereby, the operation data of a length of 512 bits can be processed.

As described above, according to the encryption circuit in the present embodiment, two registers are provided respectively in each group of registers, and the carry-out signal and the shift-out signal are caused to form a loop through the operation circuits. Therefore, in addition to an effect shown in the first embodiment, a bit length of the operation data can readily be increased.

Third Embodiment

An encryption circuit in the third embodiment of the present invention is different from that in the second embodiment shown in FIG. 7 only in that operation circuits 0 to 3 have different configuration and function. Therefore, detailed description for redundant configuration and function will not be repeated.

Figure 9:
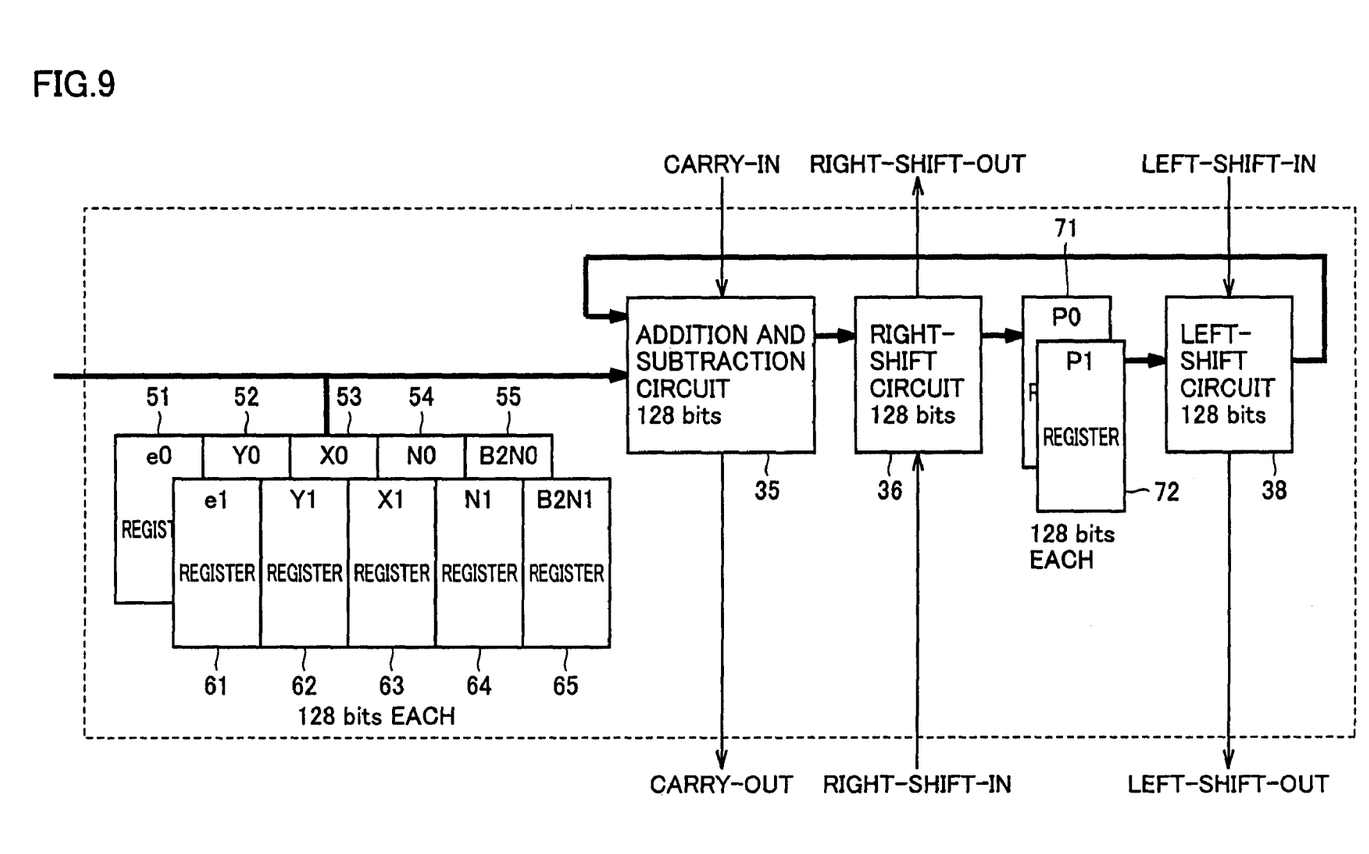
FIG. 9 is a block diagram illustrating an internal configuration of an operation circuit in a third embodiment.

FIG. 9 is a block diagram illustrating an internal configuration of an operation circuit in the third embodiment. Compared to the internal configuration of the operation circuit in the second embodiment shown in FIG. 8, the operation circuit of the present embodiment is different only in that a B2N0 register 55 and a B2N1 register 65 for calculating in advance fixed data for storage, which is to be used repetitively during the operation, before the operation by the operation circuit, are added. Therefore, detailed description for redundant configuration and function will not be repeated.

For details of the operation algorithm using B2N0 register 55 and B2N1 register 65, refer to the aforementioned references.

As described above, according to the encryption circuit in the present embodiment, the fixed data to be used repetitively during operation is calculated in advance, and stored in B2N0 register 55 and B2N1 register 65. Therefore, in addition to the effect shown in the first embodiment, the number of clocks required for a specific operation can be reduced, and the operation processing can be carried out with high speed.

Fourth Embodiment

An encryption circuit in the fourth embodiment of the present invention is different from that in the second embodiment shown in FIG. 7 only in that operation circuits 0 to 3 have different configuration and function. Therefore, detailed description for redundant configuration and function will not be repeated.

Figure 10:
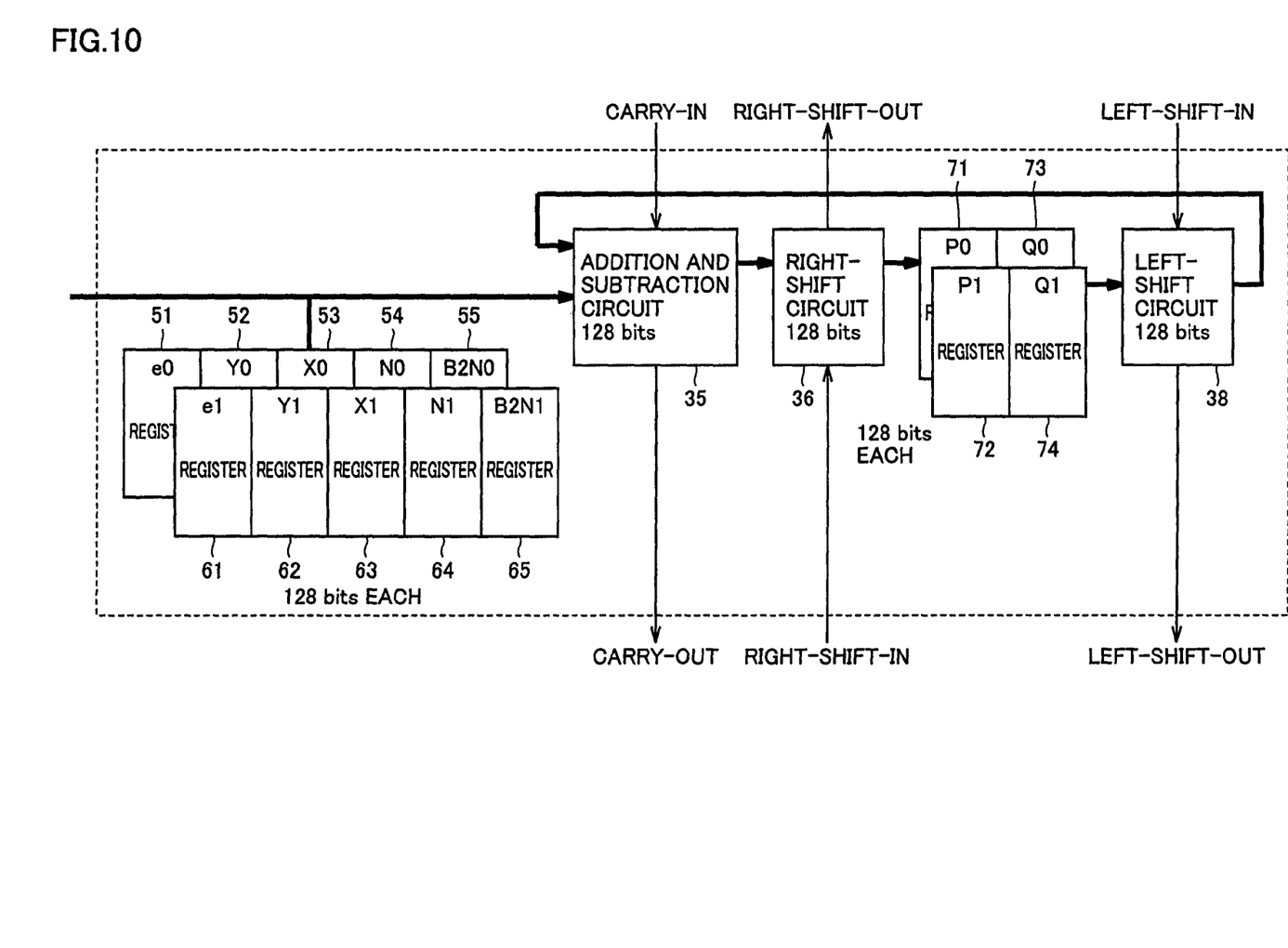
FIG. 10 is a block diagram illustrating an internal configuration of an operation circuit in a fourth embodiment.

FIG. 10 is a block diagram illustrating an internal configuration of an operation circuit in the fourth embodiment. Compared to the internal configuration of the operation circuit in the third embodiment shown in FIG. 9, the operation circuit of the present embodiment is different only in that a Q0 register 73 of 128 bits and a Q1 register 74 of 128 bits are added. Therefore, detailed description for redundant configuration and function will not be repeated.

As a register temporarily storing the operation result, Q0 register 73 of 128 bits and Q1 register 74 of 128 bits are provided in addition to P0 register 71, P1 register 72. Thus, a quotient and a remainder can be held in these registers as the operation result. Therefore, the operation circuit will be able to perform a division processing.

In addition, when multiplication of 1024 bits×1024 bits is performed, a register holding a multiplication result of 2048 bits is necessary. Here, the multiplication result can be held by using P0 register 71, P1 register 72, Q0 register 73, and Q1 register 74, and thus, multiplication of 1024 bits×1024 bits can be attained.

As described above, according to the encryption circuit in the present embodiment, Q0 register 73 of 128 bits and Q1 register 74 of 128 bits are provided in addition to P0 register 71, P1 register 72. Accordingly, in addition to the effect shown in the first embodiment, the division processing and the multiplication processing of the operation data having a large bit length can be performed. Moreover, operation for generation processing of an inverse element or generation processing for a key, for example, can be achieved.

Fifth Embodiment

An encryption circuit in the fifth embodiment of the present invention is different from that in the second embodiment shown in FIG. 7 only in that operation circuits 0 to 3 have different configuration and function. Therefore, detailed description for redundant configuration and function will not be repeated.

Figure 11:
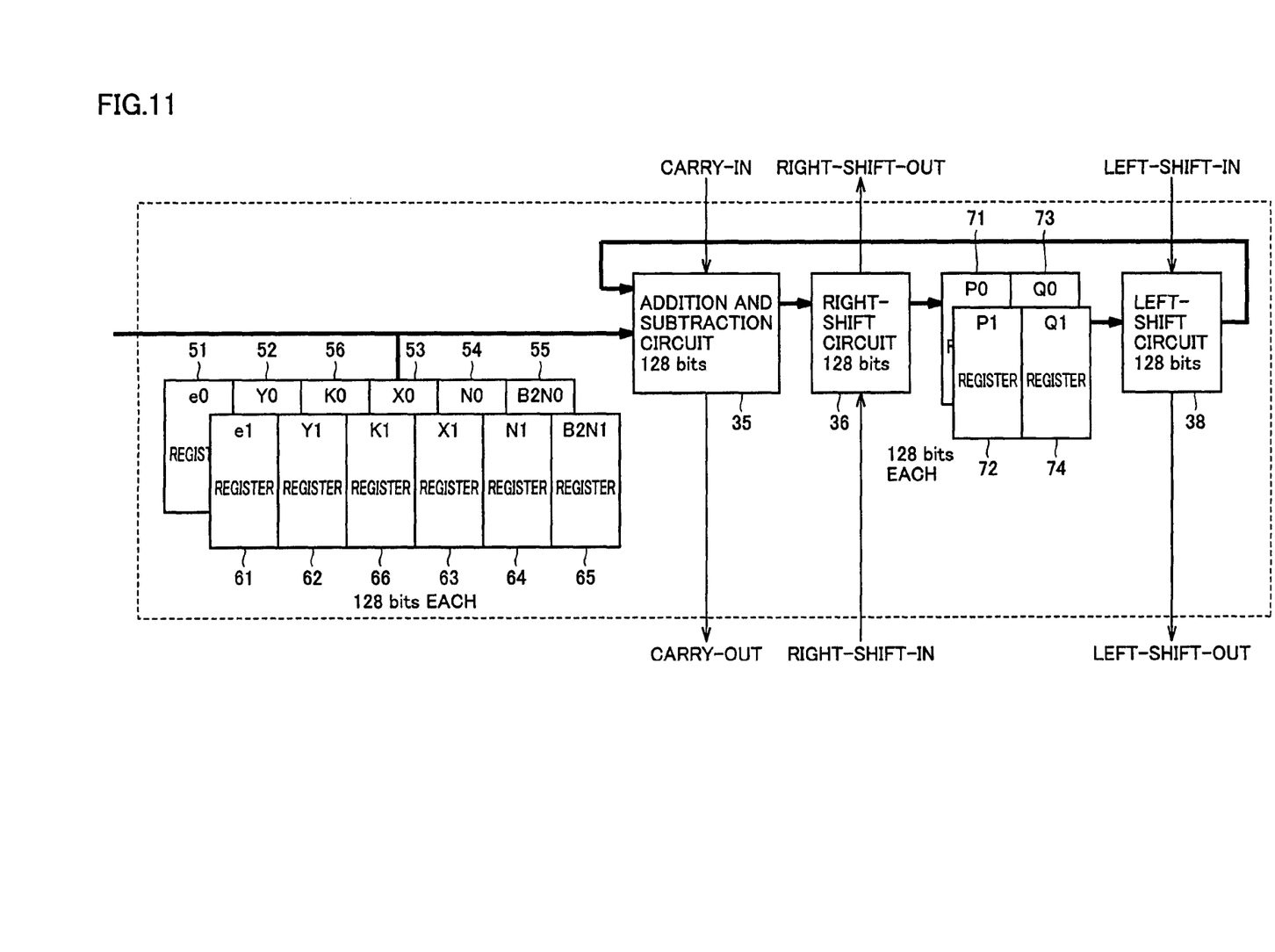
FIG. 11 is a block diagram illustrating an internal configuration of an operation circuit in a fifth embodiment.

FIG. 11 is a block diagram illustrating an internal configuration of an operation circuit in the fifth embodiment. Compared to the internal configuration of the operation circuit in the fourth embodiment shown in FIG. 10, the operation circuit of the present embodiment is different only in that data registers K0 (56) and K1 (66) of 128 bits are added. Therefore, detailed description for redundant configuration and function will not be repeated.

In order to perform an operation with respect to operation data of 2048 bits, four groups of registers of the total of 2048 bits should be provided. In such a case, the operation data goes through four operation circuits 0 to 3 four times. In addition, when the power remainder operation of 2048 bits is performed, a power e is needed merely for repeating Montgomery multiplication remainder operation, because power e has a small number of bits and has a fixed value. Therefore, if the register groups are re-defined as four 2048-bit registers, such as YY={e, Y}, NN={B2N, N}, XX={K, X}, PP={Q, P}, and the control circuit is configured so as to implement the operation algorithm of 2048 bits, the power remainder operation of 2048 bits can be achieved.

In addition, if the control circuit is configured so as to be able to utilize K register used as an XX register, in a manner similar to other registers, an operation modulo a composite number obtained by Chinese remainder theorem can be implemented by performing addition, subtraction, and multiplication. Further, by adding a processing reading a sign of the operation result of addition and subtraction, multiplication, and division, operation with an extended Euclidean algorithm can be achieved. Thus, calculation of the inverse element required for generation of a private key or Chinese remainder theorem will be possible.

As described above, according to the encryption circuit in the present embodiment, registers are re-defined to allow the processing of the operation data having a large bit length. Therefore, in addition to the effect shown in the first embodiment, the number of registers necessary for the operation can be reduced, and the circuit size can be made smaller.

Sixth Embodiment

An encryption circuit in the sixth embodiment of the present invention is different from that in the second embodiment shown in FIG. 7 only in that operation circuits 0 to 3 have different configuration and function. Therefore, detailed description for redundant configuration and function will not be repeated.

Figure 12:
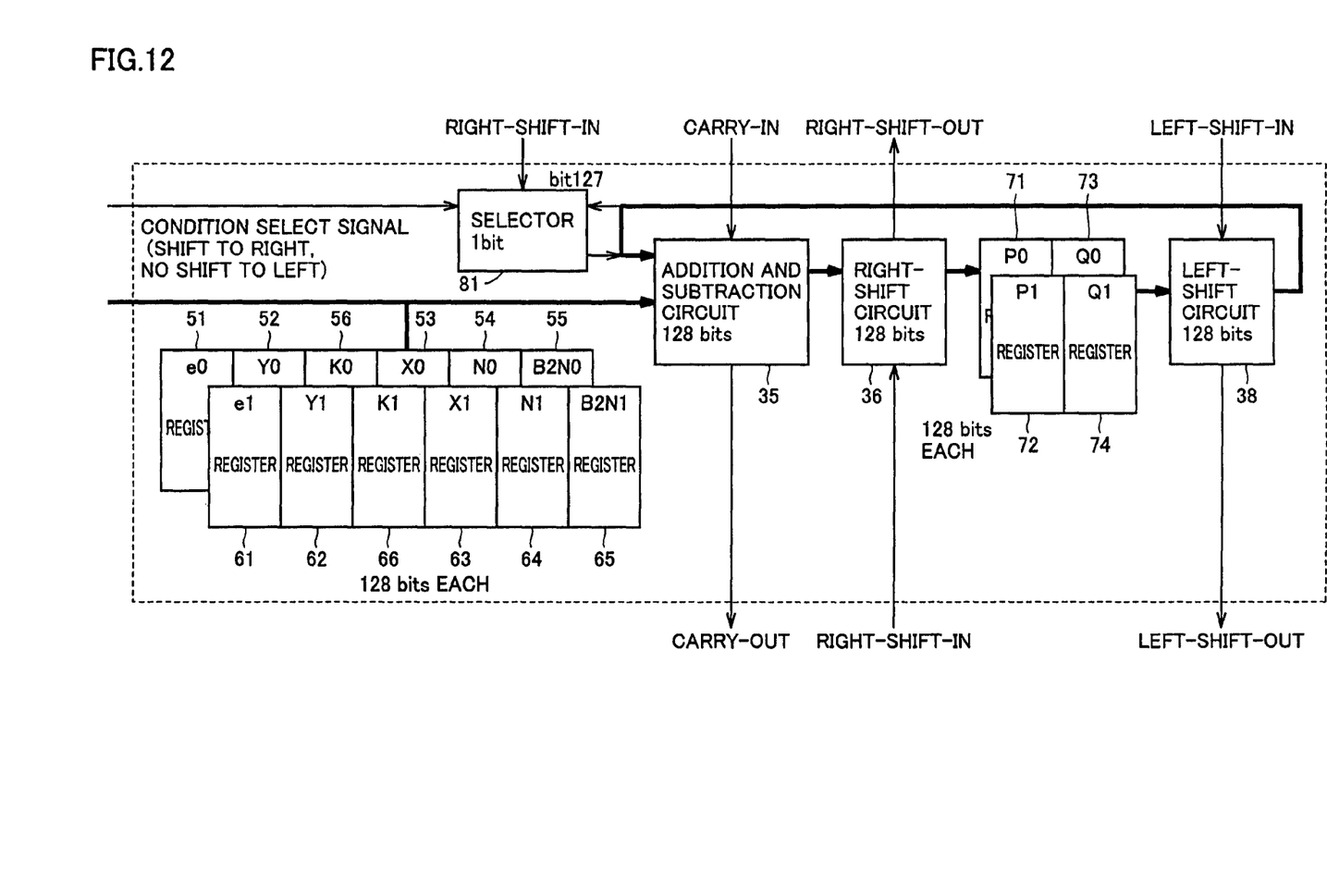
FIG. 12 is a block diagram illustrating an internal configuration of an operation circuit in a sixth embodiment.

FIG. 12 is a block diagram illustrating an internal configuration of an operation circuit in the sixth embodiment. Compared to the internal configuration of the operation circuit in the fifth embodiment shown in FIG. 11, the operation circuit of the present embodiment is different only in that a selector 81 of 1 bit switching between a right-shift-in signal and a left-shift-in signal is added. Therefore, detailed description for redundant configuration and function will not be repeated.

Selector 81 determines whether to select the right-shift-in signal for output or the left-shift-in signal for output with a condition select signal. In the first to fifth embodiments, when the operation in which right-shift is performed but left-shift is not performed is carried out, the right-shift-out in the previous stage input by the right-shift-in signal is stored in the most significant bit of {Q, P} register, and is input to addition and subtraction circuit 35 via the left-shift circuit.

In such a circuit configuration, since it takes time for the right-shift-in signal to be input to addition and subtraction circuit 35, it may be difficult to increase the operation frequency of the operation circuit. In the present embodiment, in the operation in which right-shift is performed but left-shift is not performed, control circuit 21 switches selector 81 with the condition select signal, and the right-shift-in signal can directly be input to addition and subtraction circuit 35.

In the first embodiment, as shown in FIG. 5, bits 0 to 126 of the data have been written in P register 37 at the fall of clock T2, and after half clock, bit 127 of the same has been written at the rise of clock T3. On the other hand, in the present embodiment, bits 0 to 126 of the data are written in P register 37 at the fall of clock T2, and after one clock, bit 127 of the same is written at the fall of clock T3. Therefore, in writing bit 127 into P register 37 in operation circuit 0 (41), a time margin from the right-shift-out signal of the higher-order operation circuit 1 (42) will be improved, compared to the first to fifth embodiments. Thus, the encryption circuit can operate with higher operation frequency.

As described above, according to the encryption circuit in the present embodiment, selector 81 switches between the right-shift-in signal and the right-shift-in signal that has passed through {Q, P} register and left-shift circuit 38 (the left-shift-in signal). Therefore, in addition to the effect shown in the first to fifth embodiments, the time margin in writing the right-shift-in signal into P register 37 can be improved, and the operation frequency of the encryption circuit can be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An encryption circuit, comprising:
   a plurality of operation circuits which are connected; and
   a control circuit dividing data to plural parts for providing to each of said plurality of operation circuits and controlling said plurality of operation circuits to provide encryption or decryption control; wherein
   each of said plurality of operation circuits includes
   a first register holding corresponding part of data as operation data,
   an addition and subtraction circuit performing addition and subtraction with respect to the operation data held in said first register,
   a right-shift circuit performing right-shift with respect to an operation result by said addition and subtraction circuit, and
   a second register holding an operation result by said right-shift circuit,
   wherein said addition and subtraction circuit in a first operation circuit performs addition and subtraction using a carry-in signal supplied from a second operation circuit, and outputs a carry-out signal as said carry-in signal of a third operation circuit,
   wherein a right-shift circuit in said first operation circuit performs right-shift using a right shift-in signal supplied from said third operation circuit, and outputs a right shift-out signal as said right shift-in signal of said second operation circuit, and
   wherein said first operation circuit receives said carry-out signal from said second operation circuit before starting a calculation thereof, receives said shift-in signal from said third operation circuit during performing the calculation thereof, supplies said carry-out signal to said third operation circuit before starting the calculation of the third operation circuit, and supplies said shift-out signal to said second operation circuit during performing the calculation of the second operation circuit.

2. The encryption circuit according to claim 1, wherein
   said addition and subtraction circuit in said first operation circuit determines the operation data at a first clock, and
   said addition and subtraction circuit in said third operation circuit determines the operation data with said carry-in signal supplied from said first operation circuit at a second clock delayed by one dock from said first clock.

3. The encryption circuit according to claim 1, wherein
   said addition and subtraction circuit in said first operation circuit determines the operation data at the first clock, and
   in the second register in said first operation circuit, a bit except for a most significant bit is written at the second clock delayed by one clock from said first clock, and the most significant bit is written at a third clock delayed by half clock from said second clock.

4. The encryption circuit according to claim 1, wherein
   said plurality of operation circuits are connected such that said carry-in signal and said shift-in signal form a loop.

5. The encryption circuit according to claim 1, wherein
   respective one of said plurality of operation circuits further includes a left-shift circuit performing left-shift with respect to the operation result held in said second register, and
   said left-shift circuit in said first operation circuit performs left-shift using a left shift-in signal supplied from said second operation circuit, and outputs a left shift-out signal as said left shift-in signal of said third operation circuit.

6. The encryption circuit according to claim 5, wherein
   said first operation circuit further includes a selector selectively outputting one of said left shift-in signal from said second operation circuit and said left shift-out signal from the left-shift circuit in said first operation circuit to the addition and subtraction circuit in said first operation circuit.

\* \* \* \* \*